(12) United States Patent
Priepke

(10) Patent No.: US 8,112,977 B2
(45) Date of Patent: Feb. 14, 2012

(54) DISC MOWER NARROW TRANSPORT FRAME

(75) Inventor: Edward H. Priepke, Lancaster, PA (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 12/708,333

(22) Filed: Feb. 18, 2010

(65) Prior Publication Data

US 2011/0197561 A1    Aug. 18, 2011

(51) Int. Cl.
*A01B 73/00* (2006.01)
(52) U.S. Cl. .......................................................... 56/228
(58) Field of Classification Search .......... 56/14.9–15.2, 56/15.6–15.8, 218, 228, DIG. 14, 1, 320.1, 56/322, 6, 7; 172/400, 405, 412, 416, 238, 172/240
See application file for complete search history.

(56) References Cited

U.S. PATENT DOCUMENTS

| | | | |
|---|---|---|---|
| 2,696,772 A | 12/1954 | Underdown | |
| 2,779,261 A | 1/1957 | Northcote et al. | |
| 4,119,329 A | 10/1978 | Smith | |
| 4,555,897 A | 12/1985 | Degelman | |
| 4,569,296 A | 2/1986 | Miller et al. | |
| 4,682,462 A | 7/1987 | Johnson, Sr. | |
| 4,934,131 A * | 6/1990 | Frisk et al. | 56/192 |
| 5,000,268 A | 3/1991 | Zimmerman | |
| 5,136,828 A | 8/1992 | Ermacora | |
| 5,199,250 A | 4/1993 | Ermacora et al. | |
| 5,642,607 A * | 7/1997 | Stephenson et al. | 56/15.1 |
| 5,970,695 A | 10/1999 | Dunn | |
| 6,845,603 B1 * | 1/2005 | Stephenson et al. | 56/218 |
| 6,907,719 B2 * | 6/2005 | Ligouy | 56/15.1 |
| 7,162,854 B2 | 1/2007 | Yeomans et al. | |

FOREIGN PATENT DOCUMENTS

EP    0399914 A1    11/1990

* cited by examiner

*Primary Examiner* — Thomas Will
*Assistant Examiner* — Mai Nguyen
(74) *Attorney, Agent, or Firm* — Patrick M. Sheldrake

(57) ABSTRACT

A wheel-supported frame for an agricultural harvester header having a tongue and a pivotally connected transverse frame, a retractable transport wheel connected to the tongue, and a pivoting mechanism for pivoting one of the supporting wheels approximately 90 degrees to align with the deployed transport wheel. The invention enables the harvester to be easily reconfigured between an operating configuration and a transport configuration. By rotating the transverse frame to align its transverse width with the direction of travel during transport, deploying the transport wheel, and aligning one of the normal support wheels with the transport direction of travel, the harvester is reoriented for transport along its lateral axis. The lateral transport apparatus is easily reconfigured by a single individual and requires no additional equipment beyond that integral to the harvester in order to reconfigure the harvester between transport and operational modes.

19 Claims, 6 Drawing Sheets

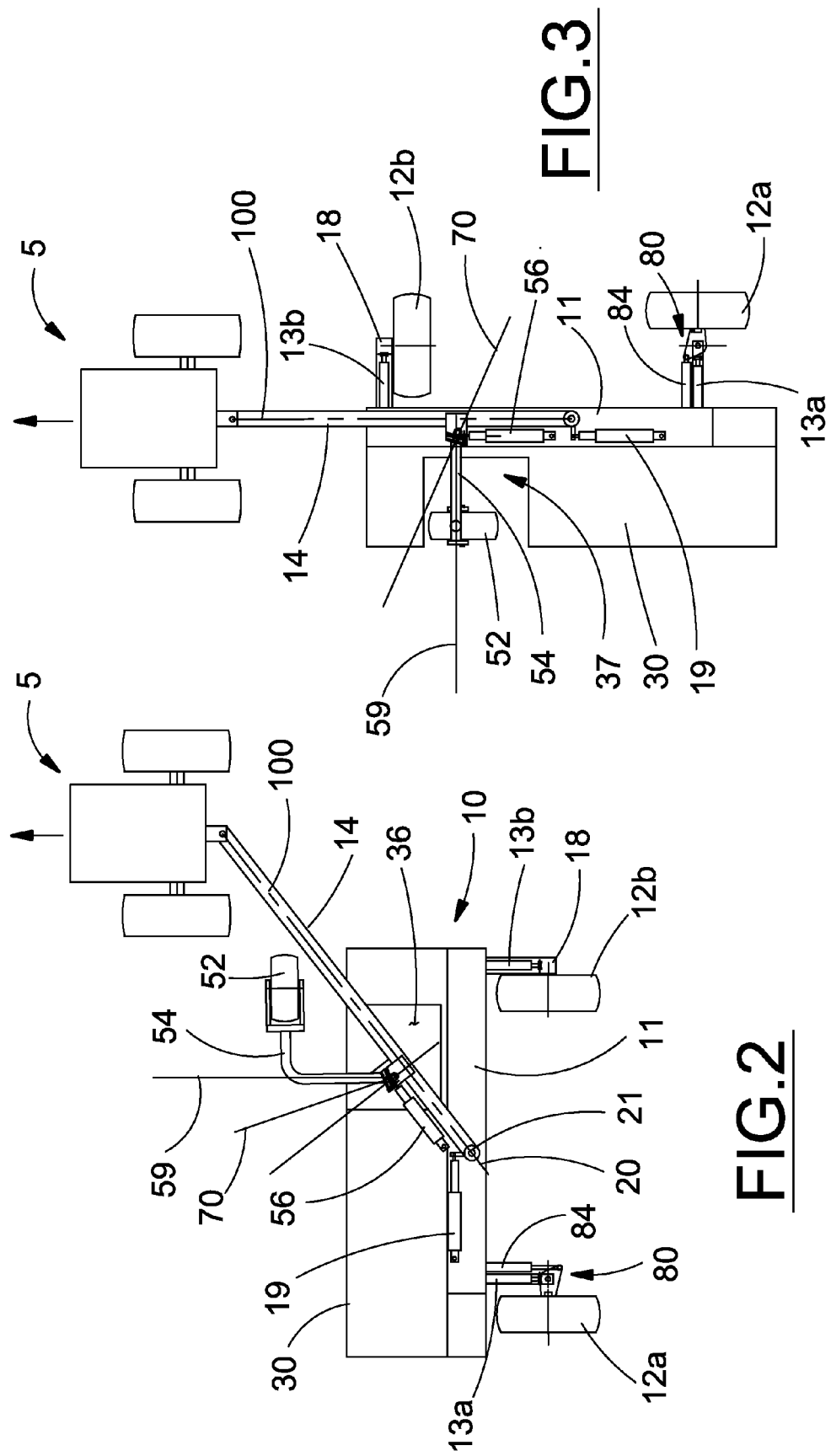

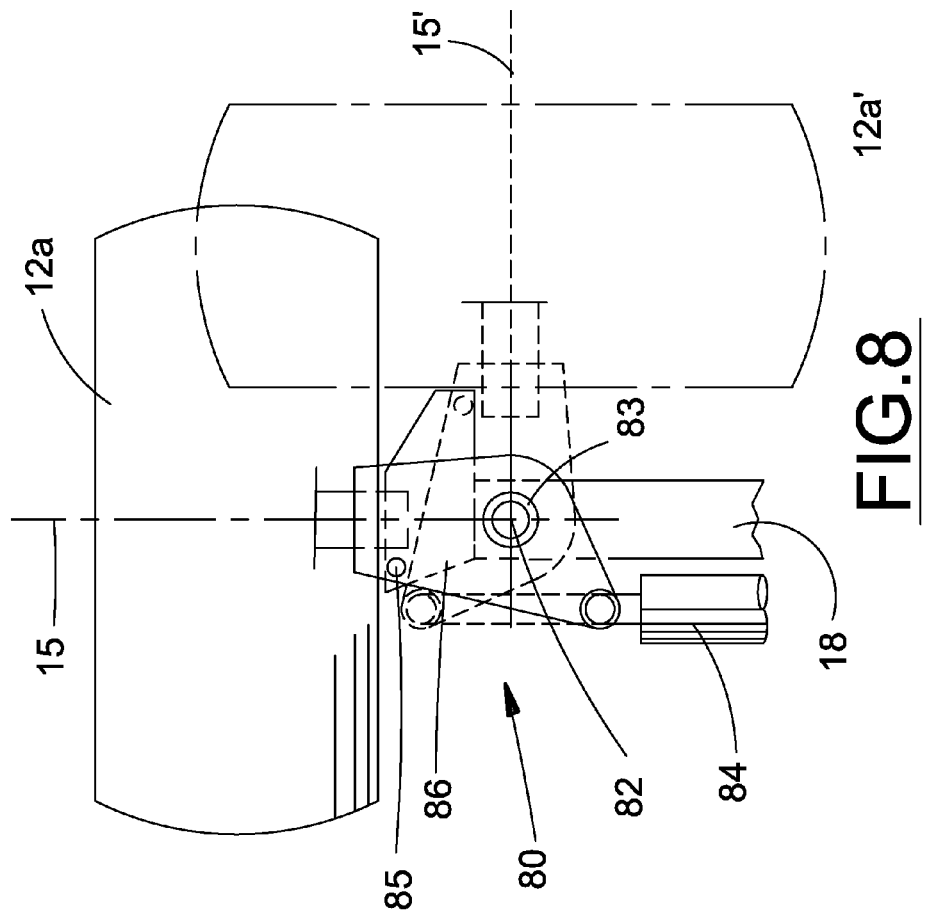
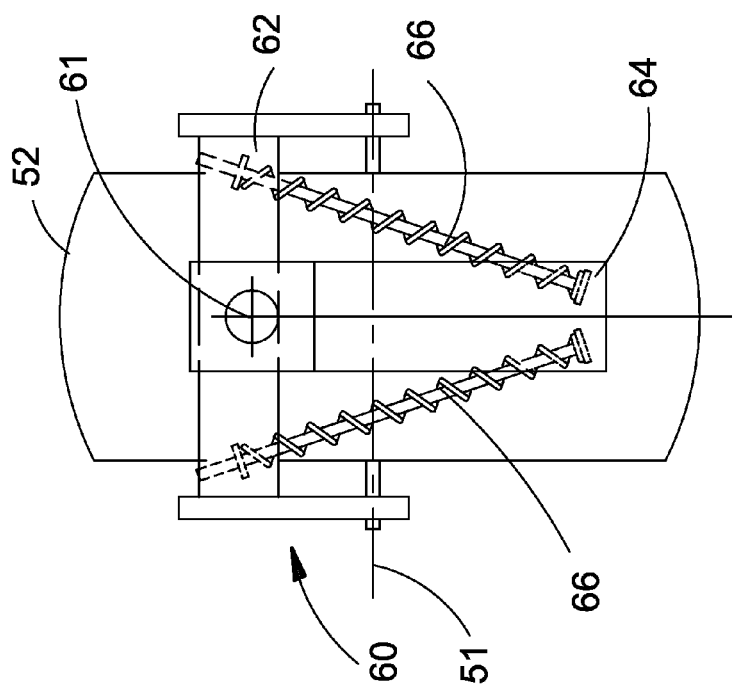

DISC MOWER NARROW TRANSPORT FRAME

BACKGROUND OF THE INVENTION

The present invention relates generally to agricultural harvesting machine, and more particularly relates to mechanism for repositioning the machine as it is trailed behind a prime mover to enable the machine to be transported in less than its operating width.

Agricultural mower-conditioner combinations are well known and include self-propelled and pull-behind types. One common problem with pull-behind mowers involves transporting the machines between fields as the width of the machine may be 15 feet or more. Machine movement may be necessary over farm lanes, through gates or even some highways where the machine width will not allow passage in the operating orientation. A typically solution is to place the mower-conditioner header mechanism on a separate trailer such that the lateral width of the mechanism is generally aligned with the length of the trailer (lateral transport) and then tow the trailer with the tractor. One such example is the Discbine™ Transporter by common assignee which is specifically configured for loading, unloading, and laterally transporting a Model 1441/1442 disc mower conditioner while attached to the operating power unit (tractor). Such special trailers add significant cost, requires significant skill to load and unload, and must be used to transport the machine between locations or separately transported.

It would be advantageous to provide a reconfigurable frame for supporting a pull-behind mower header to be laterally transported while attached to a tractor without requiring an additional implement or special trailer. Further advantages would be realized by a lateral transport system that is quickly and easily operated thereby reducing the time necessary to reconfigure the implement between operating and lateral transport configurations. Still further advantages would be realized by a lateral transport system that can be produced with less cost that the separate trailer lateral transport option it replaces.

SUMMARY OF THE INVENTION

Accordingly, the present invention, in any of the embodiments described herein, may provide one or more of the following advantages:

It is an object of the present invention to provide a lateral transport apparatus for a pull-behind agricultural harvester that is mounted on the harvester thus eliminating the need for separate trailers or adapter equipment.

It is a further object of the present invention to provide a lateral transport apparatus for a movable frame supporting a pull-behind agricultural harvester header that is selectively and easily deployable thereby enabling the header to be easily repositioned for operation or transport.

It is a further object of the present invention to provide a lateral transport apparatus for a movable support frame and pivotable tongue for an agricultural mower header in which a retractable transport wheel is attached to the pivotable tongue that can itself be pivoted into a positioned laterally displaced from the tongue and parallel to the transport axis of the machine.

It is a further object of the present invention to provide a lateral transport apparatus that is integrated with the harvester without adversely affecting the harvester performance.

It is a still further object of the present invention to provide a retractable transport wheel for a lateral transport apparatus that operates within the periphery of the machine by deploying into a space created by a fold-up header curtain shield.

It is a still further object of the present invention to provide a retractable transport wheel as part of a lateral transport apparatus that is self-steering to enable positioning forwardly or rearwardly displaced along the longitudinal transport axis from other trail frame wheel(s) supporting the machine.

It is a still further object of the present invention to provide a trailing frame wheel for a movable header support frame incorporates a pivoting mechanism for pivoting the frame wheel 90 degrees about an upright axis between operating and transport positions.

It is yet another object of the present invention to provide a lateral transport apparatus for an agricultural pull-behind harvester that may be configured in an operating or a transport mode while the harvester remains connected to a tractor.

It is yet another object of the present invention to provide a hydraulically actuated lateral transport apparatus for an agricultural harvester that may be selectively reconfigured for transport or operation by an individual operator.

It is yet another object of the present invention to provide a lateral transport apparatus that includes a simple hydraulic system that raises the trail frame, pivots one trail frame wheel 90 degrees about an upright axis, and retracts another trail wheel simultaneously.

It is a yet another object of the present invention to provide a lateral transport apparatus for an agricultural pull-behind harvester that is durable in construction, inexpensive of manufacture, carefree of maintenance, easily assembled, and simple and effective to use.

These and other objects are achieved in accordance with the instant invention by providing a wheel-supported frame for an agricultural harvester header having a tongue and a pivotally connected transverse frame, a retractable transport wheel connected to the tongue, and a pivoting mechanism for pivoting one of the supporting wheels approximately 90 degrees to align with the deployed transport wheel. The invention enables the harvester to be easily reconfigured between an operating configuration and a transport configuration. By rotating the transverse frame to align its transverse width with the direction of travel during transport, deploying the transport wheel, and aligning one of the normal support wheels with the transport direction of travel, the harvester is reoriented for transport along its lateral axis. The lateral transport apparatus is easily reconfigured by a single individual and requires no additional equipment beyond that integral to the harvester in order to reconfigure the harvester between transport and operational modes.

BRIEF DESCRIPTION OF THE DRAWINGS

The advantages of this invention will be apparent upon consideration of the following detailed disclosure of the invention, especially when taken in conjunction with the accompanying drawings wherein:

FIG. 2 is a plan view of the agricultural harvester and tractor shown in FIG. 1, wherein the harvester is shown configured for operation;

FIG. 3 is a plan view of the agricultural harvester and tractor shown in FIG. 1, wherein the harvester is shown configured for lateral transport;

FIG. 7 shows a detail of one embodiment of a self-steering wheel mechanism used on the transport wheel of the present invention;

FIG. 8 shows a detail of a frame trailing wheel pivoting mechanism of the present invention.

DESCRIPTION OF THE PREFERRED EMBODIMENT(S)

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Likewise, "forward" and "rearward" are determined by the normal direction of travel. "Upward" and "downward" orientations are relative to the ground or operating surface as are any references to "horizontal" or "vertical" planes. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail. When referring to the figures, like parts are numbered the same in all of the figures. Alpha designations following a numeric designator are used to distinguish the two similar parts, typically right side/left side on the generally symmetrical invention; reference to the numeric designator alone indicates the either part.

Figure 1:
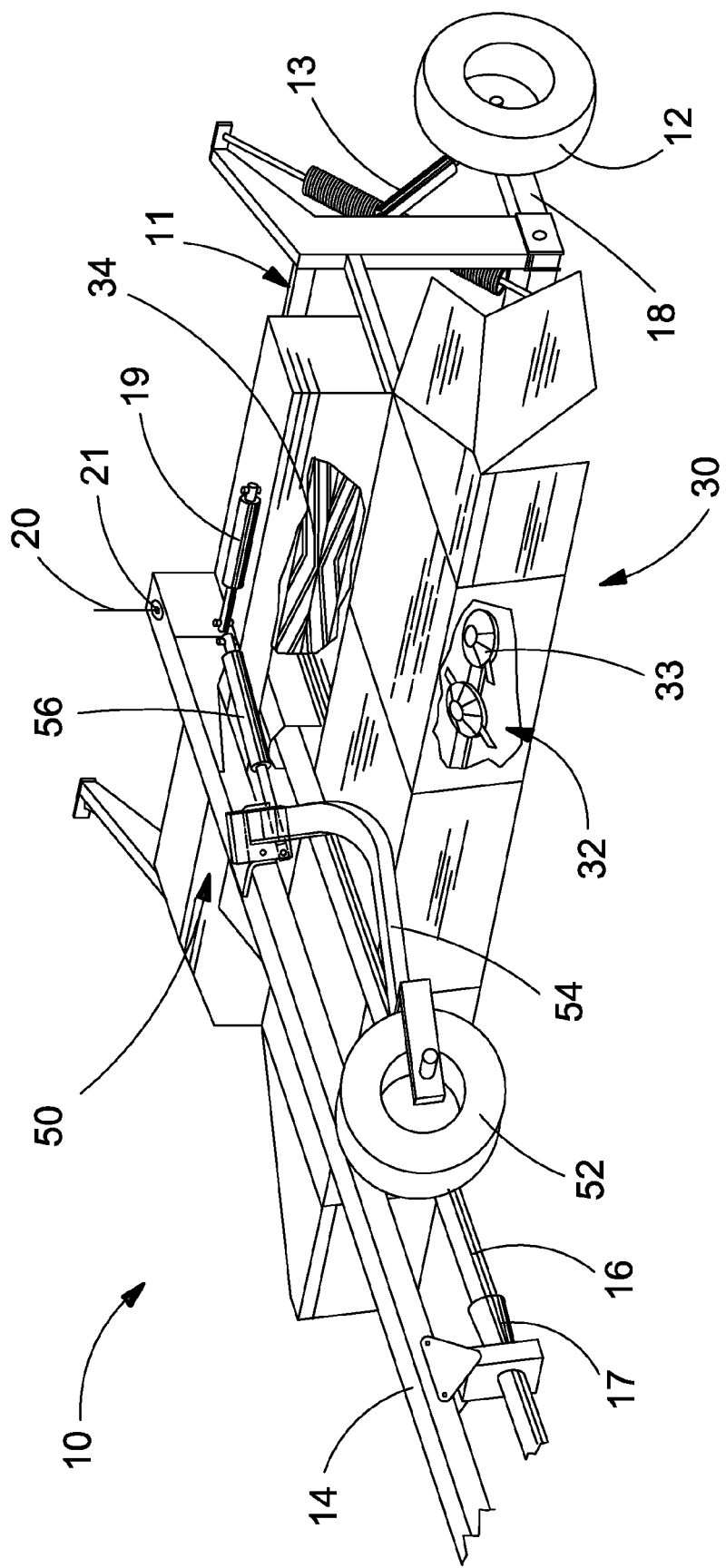
FIG. 1 is a perspective view of an agricultural pull-behind harvester wherein the harvester incorporate a first embodiment of the lateral transport system of the present invention and is shown in an operating configuration.

Referring now to the drawings and particularly to FIG. 1, an agricultural implement 10 incorporating the principles of the instant invention can best be seen. Implement 10 as presented herein is what is generally known as a pull-behind mower-conditioner and is provided with a generally conventional movable frame 11 mobilely supported over the ground by a pair of transversely spaced-apart trailing wheels 12 and a draft tongue 14 configured for connection to a tractor and aligned on trailing axis 100, as is known in the art. A harvesting header 30 is operably connected to and supported by the frame 11. Trailing wheels 12 preferably include a pair of movable trailing arms 18 whose position is managed by wheel actuators 13 to raise and lower the wheels relative to the frame 11 thereby enabling the vertical position relative to the ground of frame 11 to be adjusted. The wheel 12 adjustment capability allows the implement 10 to be raised to clear obstructions or windrows and lowered to bring the attached header 30 operably close to the ground.

As is common in many pull-behind implements, the draft tongue 14 is pivotally connected to the implement frame 11 at pivot connection 21, the pivotal movement thereof rotating the frame 11 and the connected header 30 about a generally vertical implement pivot axis 20. This pivotal movement between the frame 11 and tongue 14 normally enables the header 30 to be laterally offset from the tractor during operation to avoid driving the tractor through standing crop material. Pivotal movement between the frame 11 and the tongue 14 about the implement pivot axis 20 is typically accomplished by a implement pivot actuator 19 interconnecting the tongue 14 and the frame 11, movement of which is selectively controlled by the tractor operator using the tractor hydraulic control system. Through manipulation of the implement pivot actuator 19, typically a hydraulic cylinder, the mower conditioner header 30 can be moved between a transport position behind the tractor and an operative position outboard to the right or left of the tractor so that the implement 10 can be operated without the tractor running over the standing crop. Rotational power for the header 30 is delivered from the tractor by a power-take-off (PTO) shaft 16 rotatably coupled with the tractor in a conventional manner. A shaft coupling 17 is provided to enable the PTO shaft to be easily disconnected and stowed for machine transport.

The mower-conditioner header 30 is provided with a crop cutting mechanism 32, also referred to as a cutterbar. One common cutterbar design features a plurality of transversely spaced disc cutter members 33 operable to sever standing crop material by an impact action. A conditioning mechanism 34 may be mounted in the header 30 rearwardly of the cutterbar 32 to receive and condition crop material severed by the cutterbar prior to discharge onto the ground behind the header. For background information on the structure and operation of agricultural mower-conditioner headers, reference is made to U.S. Pat. No. 5,778,647, issued to McLean et al., the descriptive portions thereof being incorporated herein by reference. Those skilled in the art will recognize the usefulness of the instant invention on other pull-behind implements supported by reconfigurable frames.

Also shown in FIG. 1 is a movable transport wheel assembly 50 connected to the tongue 14 comprising a transport wheel 52, a transport arm 54, a transport pivot connector 55 (refer to FIGS. 4 and 5), and a transport arm actuator 56. The pivot connector 55 limits pivotal movement of the transport arm to pivoting about transport pivot axis 70 while allowing the transport wheel to be moved between a stowed position adjacent to the tongue 14 and a deployed position laterally spaced-apart from tongue 14 and aligned for travel in a direction generally parallel to the tongue. As depicted, the movable transport wheel assembly 50 is shown stowed, that is configured for operation of the implement 10. The transport wheel assembly 50 enables the head 30 to be reconfigured relative to the direction of travel for convenient transport with minimal width.

Referring to FIGS. 2 and 3, the implement 10 is shown in an operational configuration (FIG. 2) and a transport position (FIG. 3). In the operational configuration, the mower header 30 is laterally offset to the left of the tractor 5 travel path by operation of the tongue pivot actuator 19. The tongue trailing axis 100 is angled with respect to the direction of travel of tractor 5. Transport wheel assembly 50 is positioned in an operating position in which the transport arm 54 is pivoted upwardly and forwardly to position the transport wheel 52 generally adjacent to the tongue 14 where it will not interfere with normal operation of the mower header 30 suspended below. In this position, transport arm 54 extends along arm axis 59 which is angled forwardly with respect to the trailing axis 100 and vertically with respect to a horizontal plane encompassing the trailing axis 100. In a preferred embodiment, the upward and forward angles of the arm axis are approximately equal.

When configured for transport, the frame 11 is further pivoted relative to tongue 14 to a position at which the normal transverse width of the header 30 is aligned generally parallel with the tongue 14 and trailing axis 100 which are generally aligned with the direction of travel. The transport wheel assembly 50 is pivoted rearwardly and downwardly by transport actuator 56 until the transport arm 54 extends to a position laterally spaced-apart from tongue 14 and transport wheel 52 wheel comes into supporting contact with the ground. In order to minimize the overall transport width of the implement in transport configuration, the transport wheel is positioned within the footprint of the header 30. This is accomplished by providing a fold-up section 36 in the header curtain shield that, when folded, creates an opening 37 in the header curtain shield in which the transport wheel 52 may be positioned. The left, now rearward pivoting trailing wheel 12a is pivoted a quarter-turn about an upright axis so that the wheel is aligned to roll in a direction parallel to the tongue 14. The mechanism for pivoting the trailing wheel 12a is discussed in detail later herein.

Figure 4:
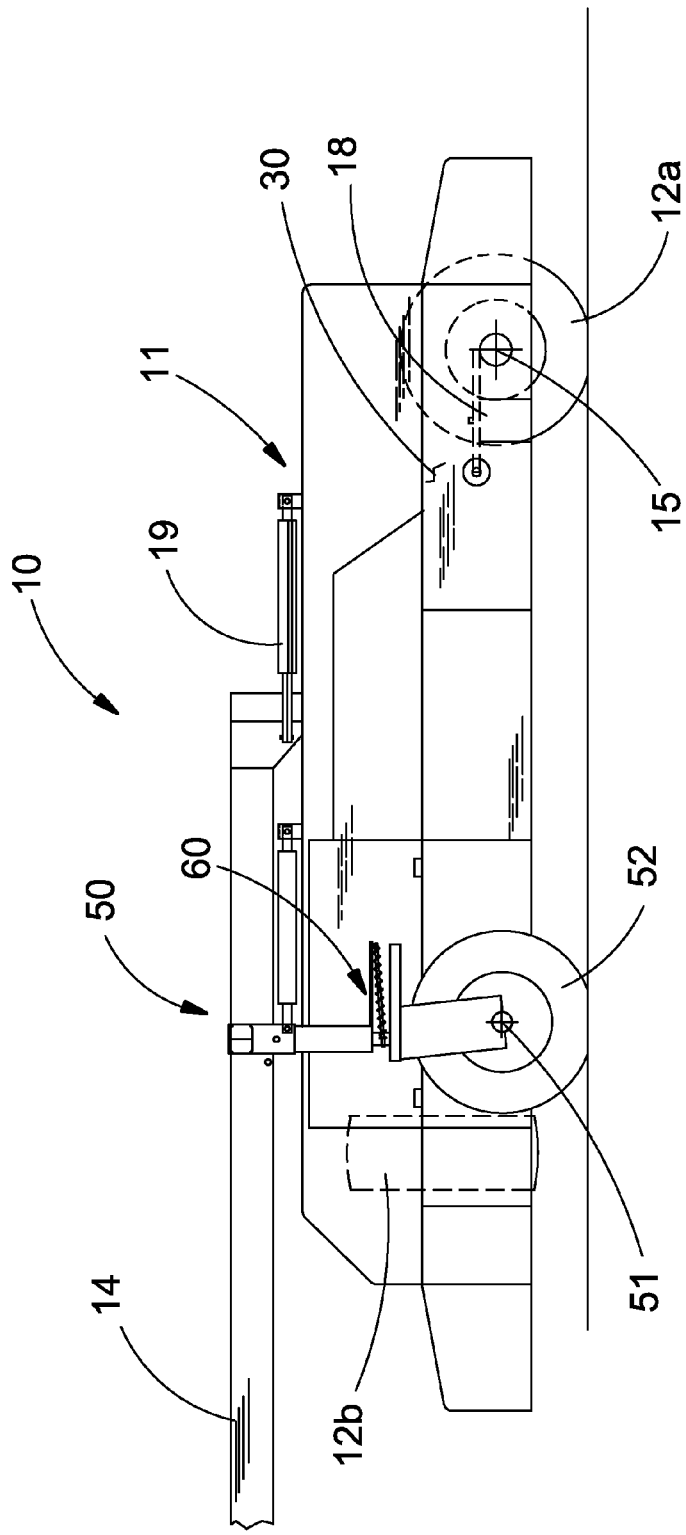
FIG. 4 is a side elevation view of the agricultural harvester implementing the first embodiment of the lateral transport system, shown in the transport configuration.

In FIG. 4, the implement 10 is shown configured for transport. The movable transport wheel assembly 50 is lowered so that transport wheel 52 contacts the ground so that frame 11 is supported by tractor 5 through the tongue 14, transport wheel 52 and pivoting trailing wheel 12a. The non-pivoting trailing wheel 12b is raised so that it no longer contacts the ground.

Figure 5:
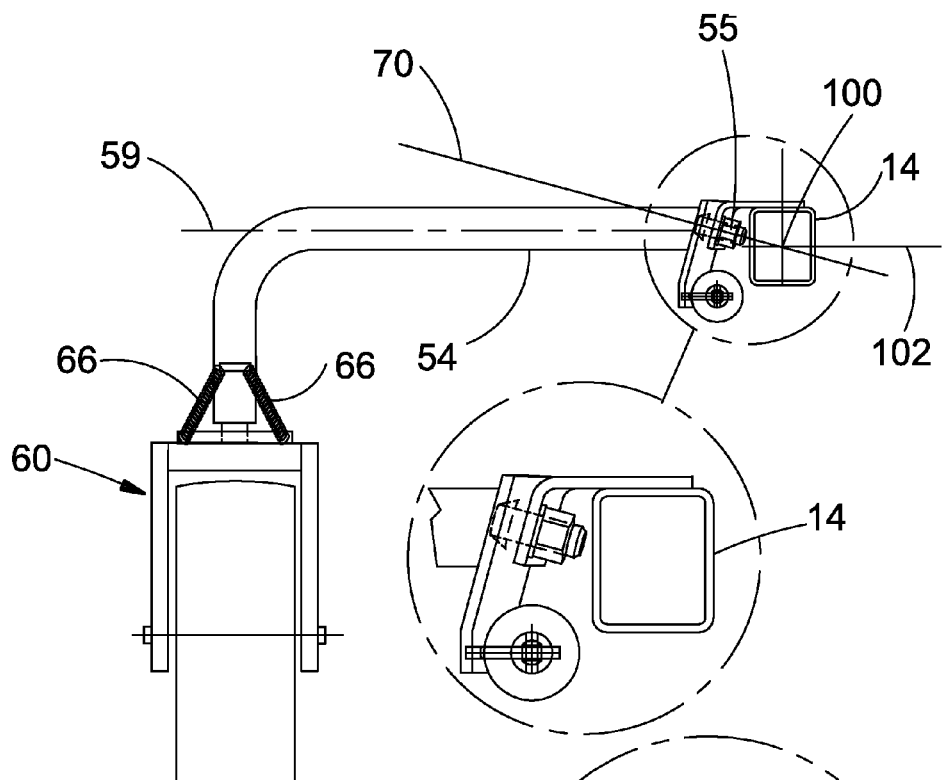
FIG. 5 is a partial rear elevation view of a transport wheel of the present invention, shown deployed in the transport configuration.
Figure 6:
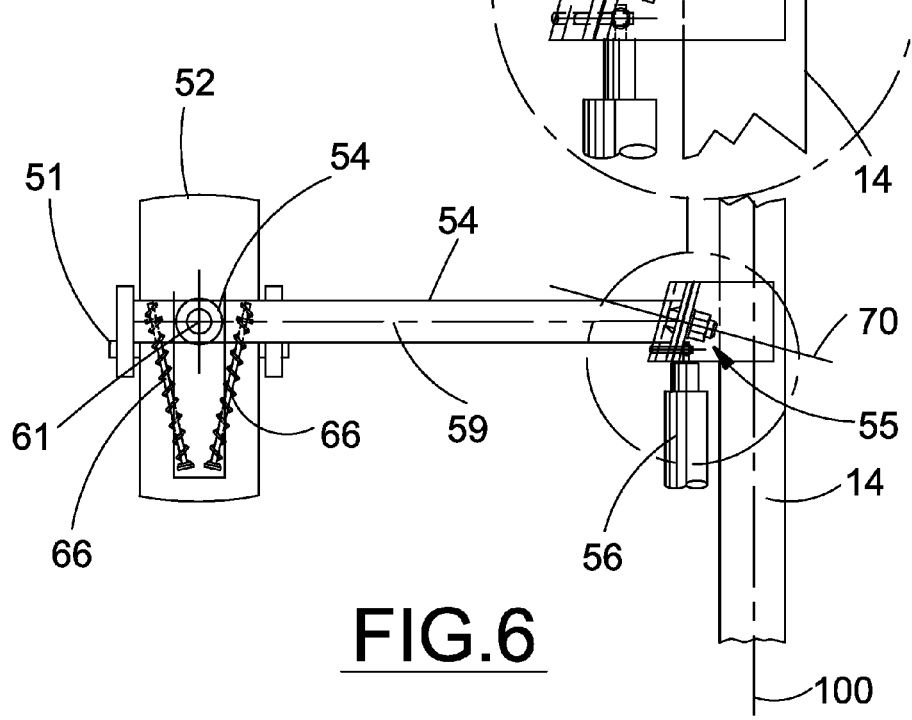
FIG. 6 is a partial plan view of the transport wheel shown in FIG. 5.

Now referring to FIGS. 5 and 6, the movable transport wheel assembly 50 is shown in additional detail. The assembly is configured for simple pivoting movement about a single transport arm pivot axis 70. The pivotal motion causes wheel 52 to move between a position forward, upward, and adjacent to tongue 14 (refer to FIG. 2) and rearward, downward and laterally spaced-apart from tongue 14 wherein the transport arm 54 extends generally perpendicularly from the tongue 14. To accomplish this, transport arm pivot axis 70 is angled relative to the tongue trailing axis 100 (shown in FIG. 6) and also angled relative to a horizontal plane 102 of the trailing axis 100 (shown in FIG. 5). The horizontal and vertical angles of the arm axis 59 relative to the trailing axis 100 are approximately twice that of the horizontal and vertical angles of the transport arm pivot axis relative to the trailing axis 100.

Referring to FIG. 7 in combination with FIGS. 4, 5 and 6, one embodiment of a trailing wheel castor mechanism 60 is detailed. The castor mechanism enables the rolling direction of transport wheel 52 to vary as the implement 10 is turned during transport. A steerable transport wheel 52 is necessary as the transport wheel axle 51 is significantly forwardly displaced along the trailing axis 100 from the trailing wheel axle 15. Without steering capability, the transport wheel would scrub during turning of the implement when configured for transport. Castor mechanism 60 comprises a traditional castor frame 62 which offsets the steering axis 61 from the transport wheel axle 51 in a configuration that is well known. In order to prevent the transport wheel from freely pivoting about the steering axis 61 and to maintain the transport wheel 52 properly aligned during deployment of the transport mechanism 50, a pair of centering springs 66 are used. Centering springs 66 connect between a fixed portion of the transport arm 54, such as a mounting boss 64, and a movable portion of the castor frame 62. Centering springs 66 are so configured to bias the transport wheel 52 for travel in the forward direction generally parallel to the trailing axis 100. During turns, the centering springs 66 will deflect sufficiently to allow the transport wheel 52 to be steered slightly by the movement of the tongue 14 and frame 11 as the implement 10 trails the tractor 5. When the tractor 5 and implement 10 return to straight-line travel, the centering springs 66 assist the return the transport wheel 52 to a straight-ahead direction of travel.

Now referring to FIG. 8 in combinations with FIGS. 2, 3, and 4, details of the mechanism enabling movement of pivoting one of the trailing wheels 12a are illustrated. The wheel pivot mechanism 80 includes a pivoting carrier 86 which is connected to frame 11 by a generally vertically oriented pivot connector pin 83 configured to allow carrier 86 to pivot about axis 82. Pivotal movement of the carrier 86 is accomplished by wheel pivot actuator 84 which interconnects the carrier and the frame 11. In the preferred embodiment, wheel pivot actuator is a hydraulic cylinder, control of which can be integrated into control of the other actuators on the implement 10 so that all of the movements can be accomplished in a coordinated manner allowing the implement to be more easily reconfigured between operating and transport configurations. During normal operation of the implement 10, the pivoting trailing wheel 12a is aligned along axle axis 13 which is parallel to the axle of the non-pivoting trailing wheel 12b. A safety catch 85 is provided to secure the carrier 86 into position and prevent inadvertent movement of the carrier during machine operation. In one embodiment, safety catch 85 is a pin simultaneously engaging holes on the carrier 86 and a fixed portion of axle 13 or frame 11.

Figure 9:
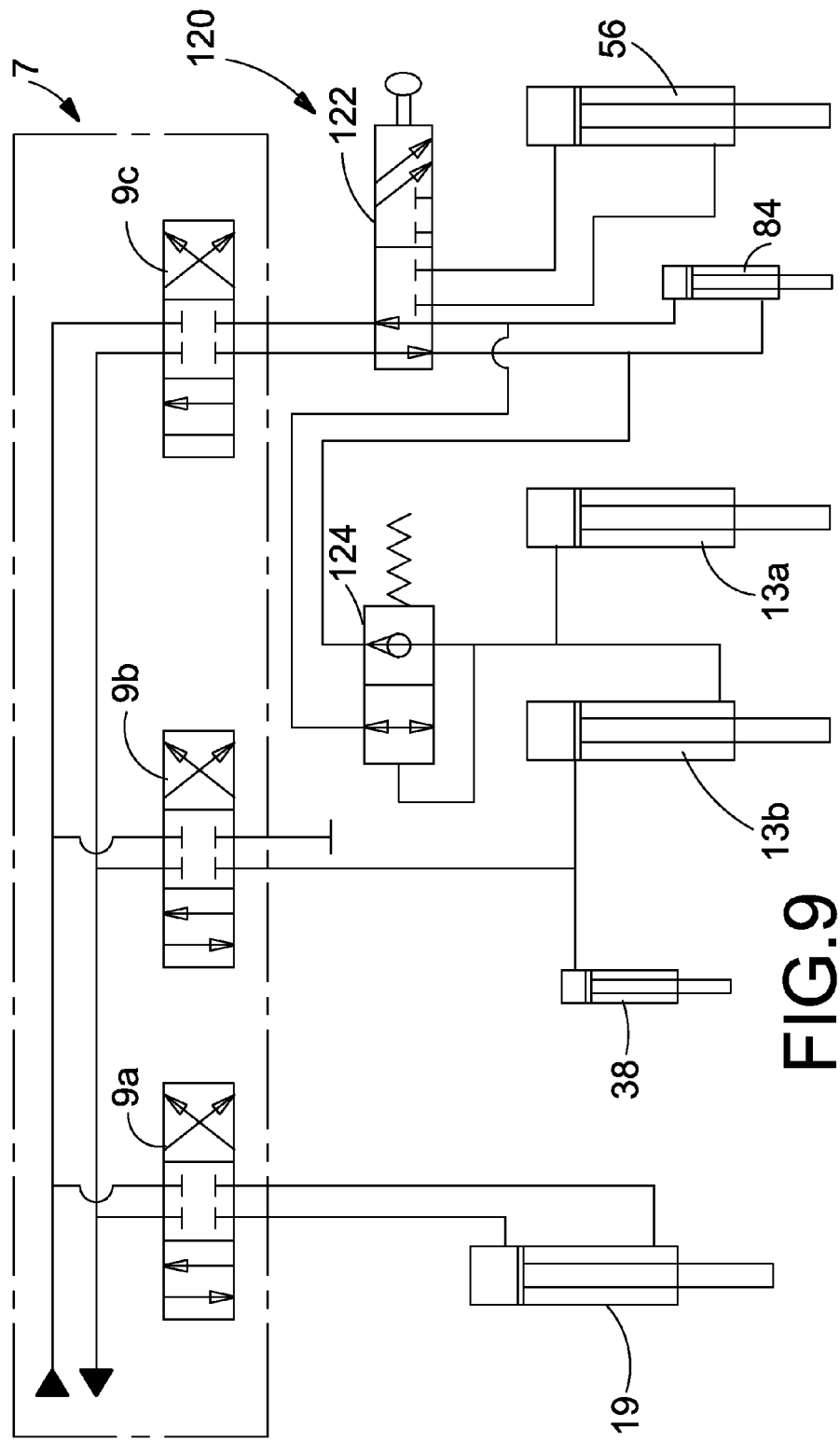
FIG. 9 is a schematic diagram of one embodiment of a hydraulic control circuit for selectively re-configuring the lateral transport system for operating or transport of the harvesting.

In FIG. 9, one embodiment of a control apparatus 120 for managing the movements of the various actuators on the implement 10 necessary to reposition the implement between operating and transport positions is shown. The preferred embodiment shown relies on the tractor's hydraulic power system 7 to provide motive force for repositioning the various actuators. Included in the tractor hydraulic power system are control valves 9a, 9b, 9c for selectively directing pressurized hydraulic fluid to the implement pivot actuator 19, the trailing wheel lift cylinders 13a, 13b and header tilt cylinder 38, the transport actuator 56, and the wheel pivot actuator 84. The transport control apparatus 120 comprises a transport selector valve 122 which receives hydraulic fluid from one of the tractor control valves 9c and coordinates movement of the transport actuator 56, the wheel pivot actuator 84, and the trailing wheel lift cylinders 13a, 13b.

To reconfigure the implement 10 from operating to transport configurations, the operator would stop the tractor first disconnect the PTO shaft from the tractor and secure it to header 30. A windrow shield 36 is moved to create an opening 37 (see FIGS. 2 and 3) for the transport wheel 52. The tractor hydraulic control valve 9a is aligned to power the pivot actuator 19 and bring the transverse axis of frame 11 into approximately perpendicular alignment with the trailing axis 100. Next, tractor hydraulic control valve 9c is aligned to supply hydraulic power to the transport control apparatus 120 so that transport selector valve 122 receives pressurized fluid. Operation of transport selector valve 122 first deploys the transport wheel assembly 50 by powering transport actuator 56 until the transport wheel 52 is in contact with the ground. The transport selector valve 122 is then realigned to power the wheel pivot actuator 84 which causes the pivot wheel 12a to pivot approximately 90 degrees to align for travel in a direction generally parallel with the trailing axis 100. As the pivot wheel is being repositioned, fluid passing through check valve 124 is supplied to wheel lift cylinders 13. The left wheel lift cylinder 13a controlling the ride height of the pivoting trailing wheel is extended while the right wheel lift cylinder 13b is retracted to raise the right trailing wheel 12b so that it is no longer in contact with the ground. At this point, the implement 10 is configured to be trailed behind the tractor 5. The trailing axis 100 generally follows the tractor's direction of travel and implement 10 is supported by transport wheel 52 and pivoting trailing wheel 12a. The steps are reversed to reconfigure the implement 10 from the transport to the operating position, except that check valve 124 is realigned to allow the wheel lift cylinders 13 to return to a normal operating mode. Manual safety latches on the transport wheel assembly 50 and pivot wheel 12a may be provided to prevent inadvertent implement reconfiguration during operation in either the operating or transport modes.

Naturally, the invention is not limited to the foregoing embodiments, but it can also be modified in many ways without departing from the basic concepts. It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A movable chassis for supporting an agricultural crop harvesting header having an operating width, said movable chassis comprising:
   an elongate tongue for connection to a prime mover for movement in a forward direction along a travel axis;
   a movable frame pivotally coupled to said tongue and movable between an operating position and a transport position, said movable frame supporting the header connected thereto and configured to orient the operating width of the header generally transverse to said travel axis when in said operating position, and configured to orient the operating width of the header generally parallel to said travel axis when in said transport position;
   a first trailing wheel and a second trailing wheel connected to said movable frame for supporting said movable frame on the ground, said first and second trailing wheels aligned for movement in the direction of said travel axis when said movable frame is in said operating position;
   a frame pivot actuator for selectively altering the pivotal position of said movable frame with respect to said tongue;
   a first wheel actuator and a second wheel actuator, each configured to adjust the vertical position of said first and second trailing wheels, respectively, relative to said movable frame;
   a retractable transport mechanism mounted to said tongue and movable between a raised stowed position and a deployed position, said transport mechanism having a transport wheel for engaging the ground to support said frame and a transport actuator for moving said mechanism between said stowed and deployed positions the connection between the transport mechanism and the tongue configured such that the wheel is moved both downward and laterally with resect to the tongue during movement from the stowed position to the deployed position; and
   an axle pivot mechanism connecting said first trailing wheel to said movable frame, said pivot mechanism having an axle pivot actuator, said pivot mechanism configured to pivot said first trailing wheel approximately 90 degrees about a generally upright pivot axis;
   wherein by positioning said movable frame in said transport position, moving said transport mechanism to said deployed position, and pivoting said first trailing wheel to a position approximately 90 degrees from said normal alignment, said movable chassis positions the header for transport such that the header operating width is aligned with said transport axis.

2. The movable chassis of claim 1, wherein said transport mechanism connection to said tongue is limited to pivotal motion about a transport mechanism axis and wherein the transport wheel is adjacent the tongue in the stowed position.

3. The movable chassis of claim 1, wherein wherein a portion of shielding of the header is removable creating an opening in the header in the travel path of the transport wheel and in a deployed position the transport wheel is positioned within a footprint of the header.

4. The movable chassis of claim 1, further comprising a control mechanism for managing the position of said first and second wheel actuators, said transport actuator, and said axle pivot actuator.

5. The movable chassis of claim 4, wherein said control mechanism is configured to control said first and second wheel actuators to lower said first trailing wheel and raise said second trailing wheel, said transport actuator to deploy said transport wheel, and said pivot actuator to pivot said first trailing wheel to a position approximately 90 degrees from said normal alignment thereby configuring said movable chassis for transport.

6. The movable chassis of claim 5, wherein said first and second wheel actuators, said transport actuator, and said pivot actuator are hydraulic actuators and wherein during actuation of the pivot actuator to the transport position the first and second wheel actuators are fluid connected such that as the first wheel actuator lowers the first trailing wheel the second wheel actuator raises the second trailing wheel.

7. The movable chassis of claim 1, wherein said first trailing wheel is laterally displaced from said tongue in a first lateral direction and said transport wheel is laterally displaced from said tongue in a direction opposite said first lateral direction when in said deployed position.

8. The movable chassis of claim 1, wherein said transport wheel is positioned forward of said first trailing wheel along said travel axis when said movable frame is in said transport.

9. The movable chassis of claim 8, wherein further comprising a biasing element connected between the transport wheel and pivot mechanism and configured for biasing said transport wheel to a position parallel to the length of the tongue when in the transport position.

10. A support frame for an agricultural header enabling the header to be propelled by a prime mover in a forward direction while configured in one of two perpendicularly arranged orientations, the support frame comprising:
   an elongate tongue;
   a movable frame pivotally coupled to said tongue and movable between an operating position and a transport position, said movable frame supporting the header connected thereto and extending generally parallel to the header operating width, said frame configured to orient said operating width of the header generally transverse to the forward direction when in said operating position, and configured to orient the operating width of the header generally parallel to the forward direction when in said transport position;
   a first trailing wheel and a second trailing wheel each connected to said movable frame, said first and second trailing wheels normally aligned for movement in the forward direction when said movable frame is in said operating position;
   a first trailing wheel actuator and a second trailing wheel actuator, each configured to adjust the vertical position of said first and second trailing wheels, respectively, relative to said movable frame;
   a retractable transport mechanism mounted to said tongue, said transport mechanism pivotable about transport pivot axis between a raised stowed position and a deployed position, said transport mechanism having a transport wheel for engaging the ground to support said frame and a transport actuator for moving said mechanism between said stowed and deployed positions the connection between the transport mechanism and the tongue configured such that the wheel is moved both downward and laterally with respect to the tongue during movement from the stowed position and to the deployed position; and
   an axle pivot mechanism connecting said first trailing wheel to said movable frame, said pivot mechanism having an axle pivot actuator, said pivot mechanism configured to pivot said first trailing wheel approximately 90 degrees about a generally upright pivot axis;

wherein by positioning said movable frame in said transport position, moving said transport mechanism to said deployed position, and pivoting said first trailing wheel to a position approximately 90 degrees from said normal alignment, said movable frame positions the header for transport such that the header operating width is aligned for movement along the forward direction.

11. The movable frame of claim 10, further comprising a control mechanism for managing the position of said first and second wheel actuators, said transport actuator, and said axle pivot actuator.

12. The movable frame of claim 11, wherein said control mechanism manages the positions of said first and second wheel actuators to lower said first trailing wheel and raise said second trailing wheel, said transport actuator to deploy said transport wheel, and said pivot actuator to pivot said first trailing wheel to a position approximately 90 degrees from said normal forward thereby configuring said movable chassis for transport.

13. The movable frame of claim 12, wherein said first and second wheel actuators, said transport actuator, and said pivot actuator are hydraulic actuators and wherein during actuation of the pivot actuator to the transport position the first and second wheel actuators are fluidly connected such that as the first wheel actuator lowers the first trailing wheel the second wheel actuator raises the second trailing wheel.

14. The movable frame of claim 10, wherein said first trailing wheel is laterally displaced from said tongue in a first lateral direction and said transport wheel is laterally displaced from said tongue in a direction opposite said first lateral direction and forward of said first trailing wheel when in said deployed position.

15. The movable frame of claim 14, further comprising a biasing element connected between the transport wheel and pivot mechanism and configured for biasing said transport wheel to a position parallel to the length of the tongue when in the transport position.

16. A method for lateral transport of an agricultural harvester header comprising the steps of:

providing an elongate tongue;

providing a movable frame pivotally coupled to the tongue and movable between an operating position and a transport position, the movable frame supporting the header connected thereto and configured to orient the header operating width generally transverse to a forward direction when in the operating position, and configured to orient the header operating width generally parallel to the forward direction when in the transport position, the header having a footprint within a horizontal frame formed by the operating width and the depth of the header;

providing a first trailing wheel and a second trailing wheel connected to the movable frame, the first and second trailing wheels aligned for movement in the forward direction when the movable frame is in the operating position;

providing a first wheel actuator and a second wheel actuator, each configured to adjust the vertical position of the first and second trailing wheels, respectively, relative to said movable frame;

providing a retractable transport mechanism connected to the tongue and movable between a stowed position and a deployed position, the transport mechanism having a transport wheel and a transport actuator for moving the mechanism between the stowed and deployed positions;

providing an axle pivot mechanism connecting the first trailing wheel to the movable frame, the axle pivot mechanism having an axle pivot actuator, the pivot mechanism configured to selectively pivot said first trailing wheel approximately 90 degrees about a generally upright pivot axis;

manipulating the movable frame from the operating position to the transport position;

manipulating the transport mechanism from the stowed position to the deployed position whereupon the transport wheel is in ground contact within the footprint of the header;

pivoting the first trailing wheel to a position approximately 90 degrees;

raising the second trailing wheel to a position at which it is no longer in ground contact; and transporting the header such that the header operating width is aligned for movement along the forward direction.

17. The method of claim 16, further comprising the steps of:

providing a control mechanism for managing the position of the first and second wheel actuators, the transport actuator, and the axle pivot actuator; and managing simultaneously by the control mechanism the positions of the first and second wheel actuators to lower the first trailing wheel and raise the second trailing wheel, the transport actuator to deploy the transport wheel, and the pivot actuator to pivot the first trailing wheel to a position approximately 90 degrees from the normal forward direction thereby configuring the movable chassis for lateral transport of the header.

18. The method of claim 17, further comprising the steps of:

providing a transport mechanism that positions the transport wheel forward of the first trailing wheel when the movable frame is positioned in the transport position; and providing a transport wheel further comprising a biasing element connected between transport wheel and pivot mechanism and configured for biasing said transport wheel to a position parallel to the length of the tongue when in the transport position.

19. The method of claim 18, wherein the first and second wheel actuators, the transport actuator, and the axle pivot actuator are hydraulic actuators and wherein during actuation of the pivot actuator to the transport position the first and second wheel actuators are fluidly connected such that as the first wheel actuator lowers the first trailing wheel the second wheel actuator raises the second trailing wheel.

* * * * *